United States Patent
Hu et al.

(10) Patent No.: US 7,730,340 B2
(45) Date of Patent: Jun. 1, 2010

(54) METHOD AND APPARATUS FOR DYNAMIC VOLTAGE AND FREQUENCY SCALING

(75) Inventors: Chunling Hu, Piscataway, NJ (US); Jack Liu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 681 days.

(21) Appl. No.: 11/707,844

(22) Filed: Feb. 16, 2007

(65) Prior Publication Data

US 2008/0201591 A1 Aug. 21, 2008

(51) Int. Cl.
*G06F 1/26* (2006.01)
(52) U.S. Cl. .................. 713/323; 713/300; 713/320
(58) Field of Classification Search .................. 713/323, 713/300, 320
See application file for complete search history.

(56) References Cited

U.S. PATENT DOCUMENTS

| | | | | |
|---|---|---|---|---|
| 7,111,179 | B1 * | 9/2006 | Girson et al. | 713/300 |
| 2005/0132238 | A1 * | 6/2005 | Nanja | 713/300 |
| 2008/0177686 | A1 * | 7/2008 | Buyuktosunoglu et al. | 706/46 |

* cited by examiner

*Primary Examiner*—Nitin C Patel
(74) *Attorney, Agent, or Firm*—Caroline M. Fleming

(57) ABSTRACT

A machine learning technique is used to improve dynamic prediction of processor utilization for multi-threaded user-level applications in a dynamic run-time environment based on processor utilization history. Processor supply voltage and processor clock frequency may be dynamically scaled based on the predicted processor utilization in order to reduce processor power consumption.

18 Claims, 4 Drawing Sheets

METHOD AND APPARATUS FOR DYNAMIC VOLTAGE AND FREQUENCY SCALING

FIELD

This disclosure relates to run-time power optimization and in particular to dynamic power optimization of multi-threaded applications in a dynamic run-time environment.

BACKGROUND

Power dissipation (P) of a device is dependent on capacitance (C), clock frequency (f) and supply voltage (V), with $P=CfV^2$. The upper limit of the clock frequency is determined by supply voltage, thus a reduction in the supply voltage results in corresponding reduction in power dissipation. However, the reduction in the supply voltage of a device results in an increase in delay through the device which results in slowing down the execution time of an application.

When memory or an Input/Output (I/O) interface in a system is busy during run-time, for example, due to last-level cache misses to memory, computation performed by the processor is not on the critical path. For traditional server application workloads, cache-misses may account for 20% of processor cycles. Thus, when high computation speed of the processor is not required, the clock frequency/supply voltage of the processor may be reduced in order to reduce the energy consumption of the system. Typically, in order to reduce power dissipation, a processor may support multiple power states and provide a software interface for handling a request to change to a lower or higher power state.

Dynamic Voltage and Frequency Scaling (DVFS) is one technique that is typically used to provide power optimization during run-time. DVFS may be performed in hardware, in an operating system (OS), or in a user-level application. A hardware-level DVFS monitors processor load and scales the processor's supply voltage without involvement of software or OS. An OS-level DVFS uses heuristic scheduling based on a fixed time interval or scheduled tasks to perform DVFS. User-level DVFS enables a user application to profile processor utilization during execution and scale the processor's supply voltage or clock frequency up or down. Typically, a just-in-time (JIT) compiler is used to recompile the user application so that it can perform DVFS.

However, in a multi-threading environment, it is possible that one user application may scale down the processor's supply voltage and clock frequency, but another computation-intensive program may need a higher clock frequency before the supply voltage is scaled up. Thus, this results in extended execution time of the computation-intensive application.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

A multi-threaded application has multiple threads of execution which execute in parallel. Each thread is a sequential flow of control within the same application (program) and runs independently from the others, but at the same time. In a multi-threading environment allowing one thread to scale up or down the processor's supply voltage or the processor's clock frequency may result in slowing down the execution of the other threads.

In an embodiment of the present invention, dynamic processor supply voltage and frequency scaling is performed in a run-time environment, for example, through a JAVA Virtual Machine (JVM), to reduce energy consumption of the system while minimizing the effect on the execution time of multi-threaded user applications.

Figure 1:
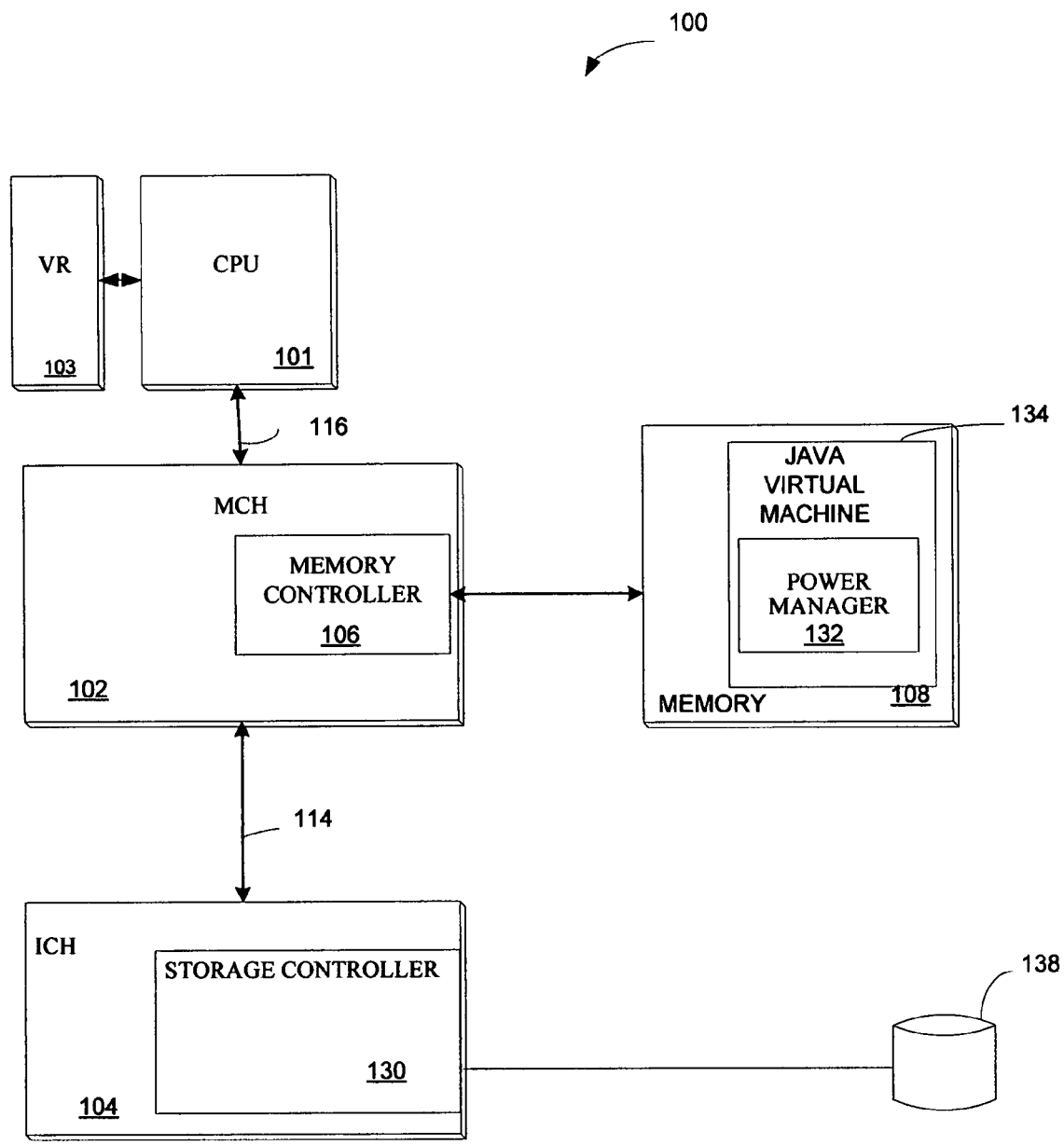
FIG. 1 is a block diagram of a system that includes an embodiment of a power manager according to the principles of the present invention.

FIG. 1 is a block diagram of a system 100 that includes an embodiment of a power manager module 132 according to the principles of the present invention. The system 100 includes a Central Processing Unit (CPU) 101, a Memory Controller Hub (MCH) 102 and an I/O Controller Hub (ICH) 104. The MCH 102 controls communication between the CPU 101 and memory 108.

The CPU 101 may be any one of a plurality of processors such as a single core Intel® Pentium IV® processor, a single core Intel Celeron processor, an ® XScale processor or a multi-core processor such as Intel® Pentium D, Intel® Xeon® processor, Intel® Core® Duo processor or Intel® Core 2 Duo® Conroe E6600 processor or any other processor.

A voltage regulator (VR) 103 may be coupled to CPU (processor) 101 to provide a supply voltage. The supply voltage may be controllable by the CPU to allow the CPU 101 to operate at a lower supply voltage, for example, to allow the CPU 101 to enter a low power, "sleep" or "idle" mode in order to save power.

The CPU 101 may include model-specific registers (MSRs) that allow the CPU 101 to be enabled to reduce power consumption. For example, when the CPU 101 is enabled to allow dynamic voltage and frequency scaling (DVFS), DVFS control instructions issued to the CPU 101 result in the CPU 101 transmitting a voltage identifier (VID) code to the voltage regulator 103 so that the voltage regulator 103 may operate at a different supply voltage. In an embodiment, the VID code may be encoded in 8-bits. In an embodiment, the CPU 101 may include a MSR (for example, MSR 198 (hexadecimal (H))) that stores current and maximum voltage and frequency identifiers and another MSR (for example, MSR 199 (H) to which a new voltage and frequency identifier is written in order to request a change in the current power state.

The memory 108 may be Dynamic Random Access Memory (DRAM), Static Random Access Memory (SRAM), Synchronized Dynamic Random Access Memory (SDRAM), Double Data Rate 2 (DDR2) RAM or Rambus Dynamic Random Access Memory (RDRAM) or any other type of memory.

The ICH 104 may be coupled to the MCH 102 using a high speed chip-to-chip interconnect 114 such as Direct Media Interface (DMI). DMI supports 2 Gigabit/second concurrent transfer rates via two unidirectional lanes. The CPU 101 and MCH 102 communicate over a system bus 116.

The ICH 104 may include a storage controller 130 for controlling communication with a storage device 138 coupled to the ICH 104.

In one embodiment, the system includes a JAVA Virtual machine (JVM) 134 that includes a power manager 132. The JVM 134 is shown stored in memory 134. While stored in memory 134, the JVM 134 may communicate with the CPU 101 through the MCH 102. The JVM 134 may also be stored in storage 138. The system supports Demand-Based Switching (DBS) and includes an operating system that provides an interface to support a power state request from a user application. This allows optimal balance between energy consumption and performance to be achieved for the system using the JVM 134.

Figure 2:
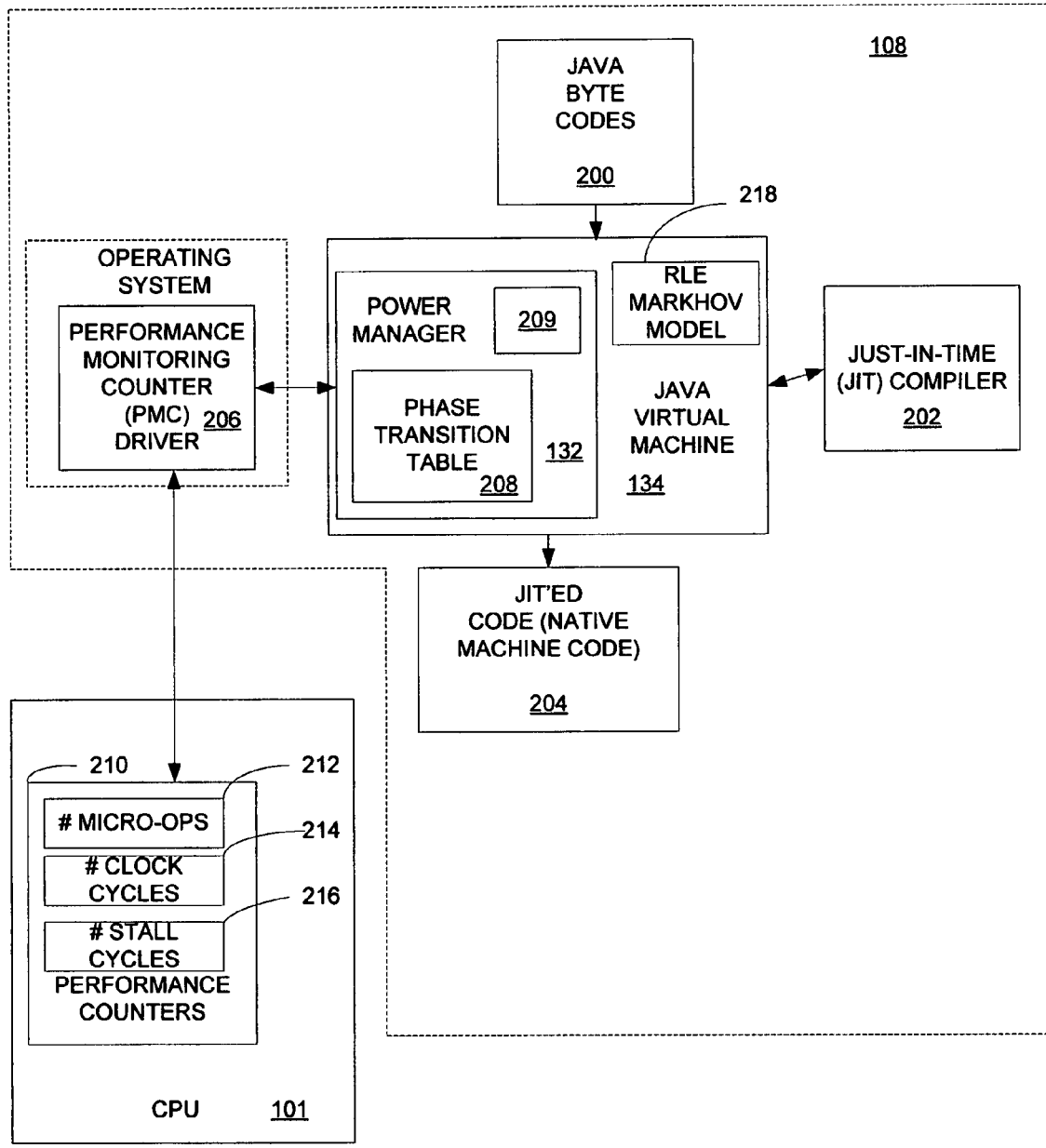
FIG. 2 is a block diagram that illustrates an embodiment of a high level framework that includes the power manager shown in FIG. 1.

FIG. 2 is a block diagram that illustrates an embodiment of a high level framework that includes the power manager shown in FIG. 1. The high-level framework illustrates how components (modules) that may be stored in memory 108 or storage 138 are interconnected.

JAVA™ is an object-oriented programming language developed by Sun Microsystems, Inc. In contrast to a native application that is compiled for a specific processor and operating system, a JAVA™ application is a platform-independent program that can execute on any system. A JAVA™ platform is a software-only platform that runs on top of other hardware-based platforms and includes a JAVA™ virtual machine (JVM) 134.

JAVA bytecodes 200 are platform independent machine code instructions for the JVM 134 that result from compiling JAVA source code files, for example, a user application. A Just in Time (JIT) compiler 202 operates on the JAVA bytecodes 200 that flow through the JVM 134 to the JIT compiler 202 at run-time to produce native machine code instructions (JIT'ed code) 204 that can be sent directly to the CPU 101 (FIG. 1) by the JVM 134. The execution time of the user application that has been converted into native machine code 204 may be partitioned into fixed length time intervals. In an embodiment, each fixed length time interval is 100 ms. An operating system typically provides some timing mechanism to applications to allow a fixed length time interval to be specified. In an embodiment, the JVM 134 may instruct the OS, for example, by calling some functions provided by the OS to send out a signal every 100 ms, and the power manager 132 can be woken up by this signal.

In other embodiments, many modern programming languages that require run-time management other than JAVA may be used. For example, object-orientated programming languages and most scripting languages include Ruby, Python, C# and Perl.

The operating system (OS) includes a performance monitoring counter (PMC) driver 206. The JVM 134 may monitor performance counters 210 in the CPU 101 in order to predict the processor utilization of a next time interval based on the utilization of the current time interval, and may scale the CPU 101 supply voltage up or down based on the predicted utilization.

In one embodiment, there are three PMCs: a first counter (number of retired micro-operations counter) 212 that is used to count the number of executed micro-operations (µops) occurring in the current time interval, a second counter (number of clock cycles) 214 is used to count the number of clock cycles in the current time interval and a third counter (number of stall cycles) 216 is used to count the number of stall cycles in the current time interval. The first counter is used to ensure negligible performance loss due to DVFS. The other two counters are used to determine the processor utilization.

An execution engine in the CPU 101 may be stalled due to cache miss, memory miss, page fault, full reorder buffer (ROB), full reservation station or branch mis-prediction. Utilization of the CPU 101 may be calculated based on the number of stall cycles and the number of clock cycles in a particular time interval. For example, with a clock frequency of 2.4 GHz, if the number of resource stall cycles is 130,000,000 in a 100 ms time interval, the processor utilization is 45.83%.

At the end of each pre-configured fixed time interval, the JVM 134 may invoke the PM 132. The PM 132 may read the performance counters 210 by requesting that the PMC driver 206 in the operating system read the performance counters 210. Based on the result of reading the performance counters 210, the PM 132 may make a scaling decision as to whether to request that the VR 103 transition to a different power state to increase or decrease the power consumption of the CPU 101.

In one embodiment in which the power manager overhead is negligible and there is a phase behavior in processor utilization for many user applications, a 100 milliseconds time interval may be used.

Figure 3:
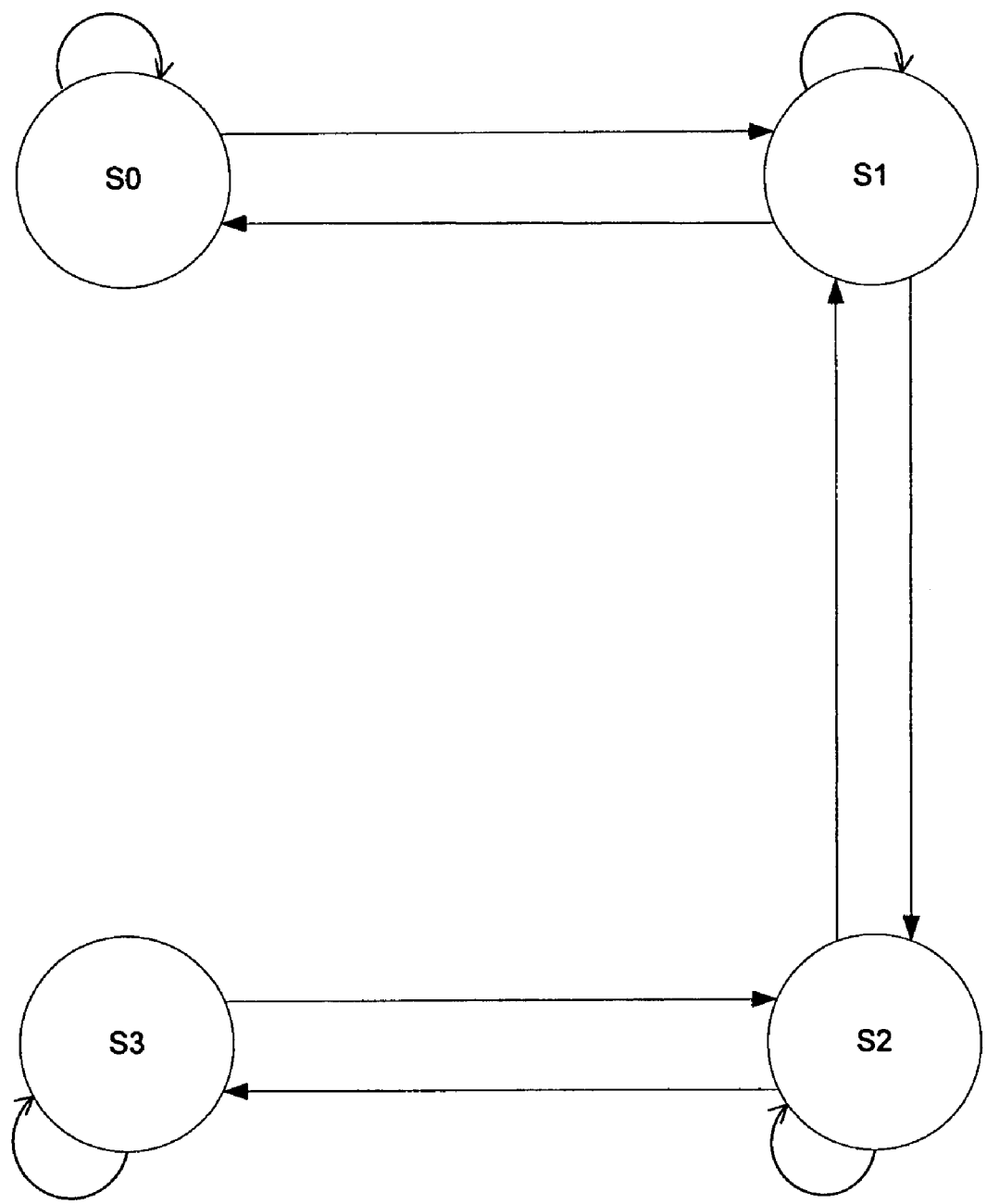
FIG. 3 is a state diagram illustrating power state transitions for a processor that has four power states.

FIG. 3 is a state diagram illustrating power state transitions of a processor that has four power states. In one embodiment, the CPU 101 is an Intel® A Core 2 Duos Conroe E6600 system. Each of the two cores (processors) in the CPU 101 may be in one of 4 possible distinct power states.

The power states and associated processor clock frequency of the Intel® Core 2 Duo® Conroe E6600 are shown below in Table 1. Each state is also typically associated with a voltage operating point. These frequency and voltage operating points may be stored within a read-only processor model specific register (MSR). A request to change power state may be sent to the CPU through a write to another MSR which results in the CPU adjusting the clock frequency and voltage operating point to stored values corresponding to the power state.

TABLE 1

| State | Clock frequency |
|---|---|
| 0 | 2.4 GHz |
| 1 | 2.1 GHz |
| 2 | 1.8 GHz |
| 3 | 1.6 GHz |

Power state 0 is the highest power state (and with the highest processor clock frequency) and power state 3 is the lowest power state (and with the lowest processor clock frequency). There is a transition to a next higher state, for example, power state 0 to power state 1, if there are more or a similar number of micro operations compared to the last interval and low processor utilization. There is a transition to a next lower state, for example, power state 1 to power state 2, if there are fewer micro-operations irrespective of the processor utilization. There is no change in power state if the number of micro-operations is close to that of the last interval and the processor utilization is not too high or too low.

The execution of a program can be partitioned into phases. In each phase, the program has some consistent behavior. Even when multiple programs are running simultaneously, there is joint phase behavior. So there is repeated behavior in processor computation ability requirement that may be used to predict the future processor utilization based on the past utilization. In this invention, a phase is assigned to each power state due to the mapping between processor utilization and the corresponding processor clock frequency. There are four phases, each of which is associated with a power state. Program execution may stay in a phase for one or more time intervals and then transfer to another phase. DVFS predicts the correct power phase for the next time interval and regulates processor voltage and frequency accordingly.

In a simultaneous multi-threading environment, to use the program behavior before the current operating point, a Markov model may be used to predict the phase transition of processor utilization based on the processor utilization of past time intervals and a history of phase transitions.

As is known to those skilled in the art, a Markov chain is a usually discrete stochastic process. A stochastic process is a process having a random probability distribution or pattern that can be analyzed statistically but not predicted precisely. For example, in a first order Markov chain the probabilities of occurrence of various future states depend only on the present state of the system or on the immediately preceding states and not on the path by which the present state was achieved. For executable code, the order of the Markov process may be greater than one and Markov models of any order may be used.

In this invention, a Run Length Encoding (RLE) Markov Model is used to predict the phase number (phase identifier (ID)) of the next time interval based on the number of time intervals that the current phase has been observed in a row and a history of phase transitions, as shown in Table 2.

Returning to FIG. 2, the power manager module 132 includes a phase transition table 208. In an embodiment in which there are four phases (power states S0-S3 (FIG. 3)), an entry for one phase (phase 0) that is stored in the phase transition table 208 is shown in Table 2 below:

TABLE 2

| current phase ID | run length | transition history | next phase ID |
|---|---|---|---|
| phase 0 | RL #0 = 5 | 0 -> 1 -> 0 | 1 |
| | | 2 -> 1 -> 0 | 0 |
| | RL #1 = 4 | TS0 | phase ID # |
| | | TS1 | phase ID # |
| | RL #2 = 8 | TS0 | phase ID # |
| | | TS1 | phase ID # |
| | RL #3 = 2 | TS0 | phase ID # |
| | | TS1 | phase ID # |

The run length column stores the number of consecutive time intervals that the current phase ID has been observed by the power manager 132. There are two phase transition history sequences (TS) associated with each subentry, that is, with each run length. The phase transition history stores the last three phase transitions that occurred before the current time interval. The next phase ID stored in each subentry associated with the run length, predicts which power phase the power manager 132 should use for the next time interval.

Run length encoding is a form of data compression in which consecutive data elements in a sequence having the same data value occurs in is stored as a single number indicating the number of consecutive data elements. In the example shown in Table 2, the entry for phase 0 includes 4 subentries, with respective run length encoding of 2, 4, 5 and 8 indicating the number of consecutive time intervals in phase 0. Each phase may either transfer to the next phase, or stay at the current phase based on the contents of the entry associated with the current phase in the phase transition table.

The values stored in the phase transition table 208 are initialized during a training period. Values for an entry are added upon detecting a power state transition.

In the training period, the values of the PMC 210 read at the end of each time interval are used to make a frequency scaling decision, that is, whether the frequency of the processor clock should be increased, decreased or unchanged. The frequency of the processor clock may be increased or decreased by requesting that the CPU 101 change to another power state with the desired frequency and associated voltage operating points.

A clock frequency scaling decision is made based on the number of finished micro-operations of the previous time interval and the current time interval, and the processor utilization of the current time interval. The decision is based on heuristic that the next time interval has the same processor utilization as the current one, the current time interval should not have less committed micro-operations than the previous time interval, and the processor utilization should not be higher than some threshold. If the calculated processor utilization is very high, the frequency of the processor's clock is low enough to affect the performance of the processor and should be scaled up. A conservative scaling method is used to scale the frequency of the processor clock to a value that is closest to the current clock frequency. If a processor is already in the highest or lowest power state, the supply voltage/clock frequency cannot be scaled up or scaled down, that is, remains unchanged.

Each entry of Table 2 is initialized based on a short length of phase transition history and the time in the current phase. For example, if the number of intervals in a row in power state 1 is 3 and the transition history is 021, and a correct transition to power state 0 is detected, an entry for phase 1 is added to the phase transition table 208 with the following values: run length: 3; transition history: 021; and next phase ID 0. Thus, the next time that 3 intervals in a row in phase 1 occurs, the prediction is that the next interval will be in phase 0 based on this entry in the phase transition table 208.

In an embodiment, the number of entries in the phase transition table 208 is fixed. However, the values stored in the entries are dynamically modified. For example, if a transition results in loss of performance, the transition is treated as a mis-prediction and the recorded history and corresponding entries in the phase transition table 208 are modified accordingly.

In the embodiment shown, at the end of each time interval, if the number of consecutive times that the current phase ID has been seen is stored in the table, the corresponding transition history is checked. If it matches the transitions that occurred before the current interval, the phase for the next time interval will be the next phase ID value of the same entry; otherwise, the next phase ID is the same as the current phase ID. For example, assuming that the processor state is at phase 0, and the transitions phase 2 to phase 1 to phase 0 have been conducted by the power manager 132, the next phase ID is either 1 or 0, dependent on the run length.

Based on the decision to scale the clock frequency of the CPU 101, the CPU's clock frequency may be changed through an interface provided for power state requests. For example, in an embodiment the interface is accessed by issuing a model-specific registers (MSRs) write instruction to write a model-specific register to request that the CPU 101 change to the power state associated with the requested processor clock frequency. For example, in the Intel Pentium® M processor and other Intel processors the power state is stored in MSR number 198 (hexadecimal (H)) and the CPU frequency may be changed through writing directly to MSR 0x199(H).

Figure 4:
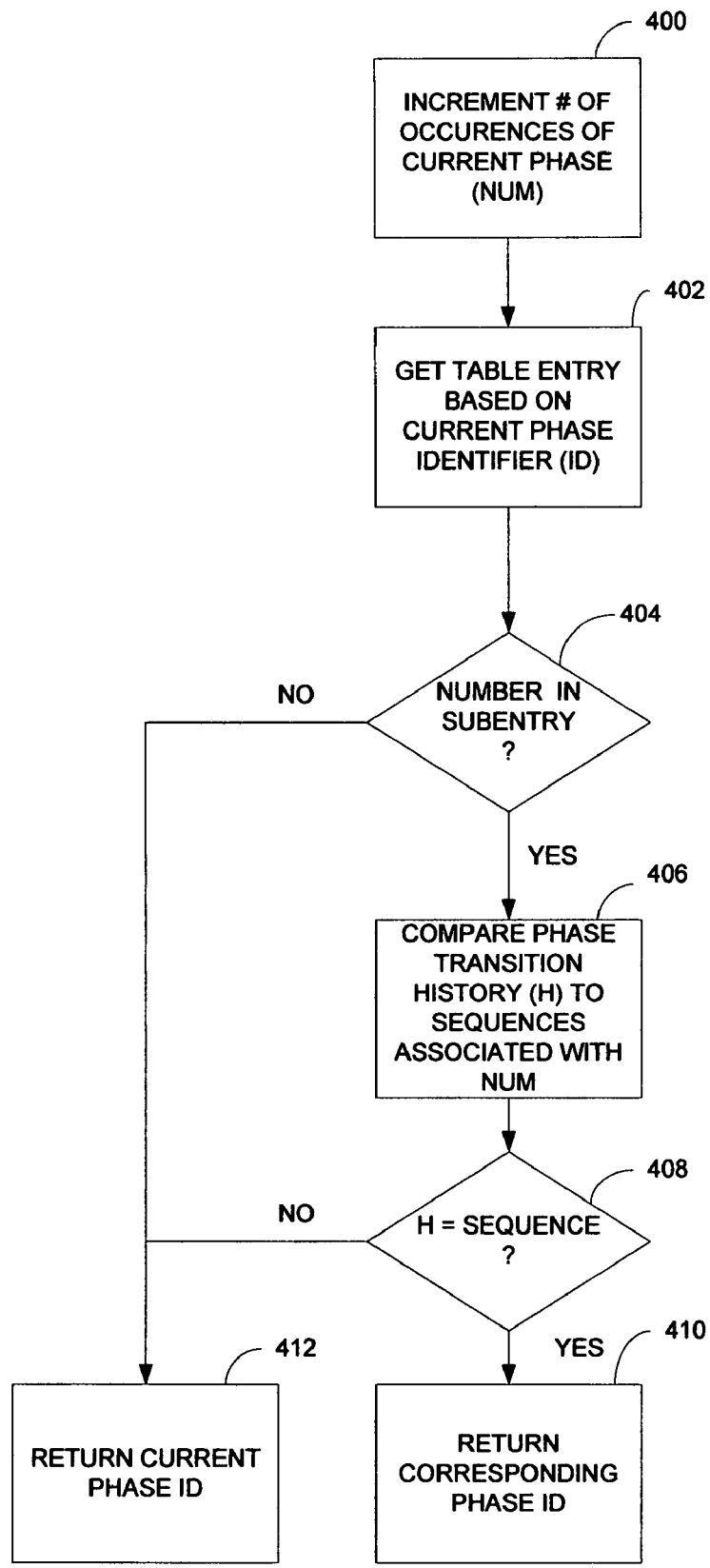
FIG. 4 is a flow graph illustrating an embodiment of a method implemented in the power manager shown in FIG. 2 for applying Dynamic Voltage and Frequency Scaling (DVFS) in a dynamic run-time environment for multi-threading applications according to the principles of the present invention.

FIG. 4 is a flowgraph illustrating an embodiment of a method for applying DVFS in a dynamic run-time environment for multi-threading applications according to the principles of the present invention.

At block 400, the number of occurrences in a row of the current phase (NUM) is incremented. Processing continues with block 402.

At block 402, the table entry corresponding to the current phase identifier is read. For example, if the current phase identifier is 0, the entry in the phase transition table 208 (FIG. 2) associated with phase 0 is read. Processing continues with block 404.

At block 404, the subentries in the phase transition table 208 are read and the values stored compared with the number of occurrences in a row of the current phase (NUM). If there is a match, processing continues with block 406. If not, processing continues with block 412.

At block 406, the recorded phase transition history stored in the power manager is compared with the sequences associated with the NUM which are also stored in the power manager. For example, in one embodiment, the maximum length of the sequence may be 8 states, that is, the power manager keeps track of the last eight states. Processing continues with block 408.

At block 408, if the recorded phase transition history matches one of the sequences stored in one of the subentries for the entry associated with the phase, processing continues with block 410. If not, processing continues with block 412. For example, the entry associated with phase 0 has two subentries that each stores a different sequence. The first subentry stores the phase sequence "phase 0-phase 1-phase 0", and the second subentry stores the phase sequence "phase 2-phase 1-phase 0". If the recorded phase transition history matches either of these sequences, processing continues with block 410.

At block 410, the recorded phase history matches one of the sequences stored for the NUM, the phase identifier corresponding to the NUM is returned. Processing is completed.

At block 412, the current phase identifier is returned. Processing is complete.

The JVM 134 has a global view of the resource requirement of the threads running in the system. This allows the processor's clock frequency to be selected based on the needs of all of the simultaneous threads running in the system.

Based on the observation of the phase behavior dependent on processor utilization of multiple programs, a Markov model is used in order to take the processor utilization history and phase transition history into consideration when the phase ID of the next time interval is predicted. This results in improved accuracy of the prediction based on the utilization of only one time interval and enables faster reaction to processor utilization changes, which results in less performance loss and more power saving.

By including the power manager in the JVM, the power management functionality is moved above the physical (hardware layer) and the operating system (OS). Thus, the power manager is portable because it can be run on any hardware or OS that supports multiple power states and includes performance counters.

The addition of an embodiment of the power manager at the user-level allows different power management strategies to be implemented easily without the need to modify hardware or the operating system. Different strategies may be implemented by varying state change thresholds used for processor utilization and supply voltage scaling.

Any server application running on top of JVM 134 may use an embodiment of the power manager 132. For example, in one embodiment, the power manager 132 may be used by a data center having a JVM 134 as middleware.

An embodiment of a power manager that is included in a JVM has been described. However, in other embodiments, the power manger may be in the OS.

It will be apparent to those of ordinary skill in the art that methods involved in embodiments of the present invention may be embodied in a computer program product that includes a computer usable medium. For example, such a computer usable medium may consist of a read only memory device, such as a Compact Disk Read Only Memory (CD ROM) disk or conventional ROM devices, or a computer diskette, having a computer readable program code stored thereon.

While embodiments of the invention have been particularly shown and described with references to embodiments thereof, it will be understood by those skilled in the art that various changes in form and details may be made therein without departing from the scope of embodiments of the invention encompassed by the appended claims.

The invention claimed is:

1. An apparatus comprising:
    a run length encoding Markov model to store a phase transition history sequence and a predicted next power state for each of a plurality of power states based on predicted utilization of a processor by a multi-threaded application executing in a dynamic run-time environment; and
    a power manager to determine a next power state for the processor for a next time interval based upon detected utilization of the processor during a time interval, the next power state selected dependent on the stored phase transition history sequence for a current power state and on a run length encoding for a phase identifier.

2. The apparatus of claim 1, wherein the power manager to compute processor utilization during a current time interval for a current power state.

3. The apparatus of claim 2, wherein processing utilization is computed based on a number of executed micro-operations, a number of clock cycles and a number of stall cycles for the current time interval stored in performance-monitoring counters.

4. The apparatus of claim 3, wherein the performance-monitoring counters are managed by an operating system.

5. The apparatus of claim 1, wherein the processor has a plurality of cores.

6. The apparatus of claim 1, wherein each power state is associated with a number of consecutive time intervals that the processor is in the current power phase.

7. The apparatus of claim 1, wherein the next power state is the current power state.

8. A method comprising:
    based on predicted utilization of a processor by a multi-threaded application executing in a dynamic run-time environment, storing in a run length encoding Markhov model, a phase transition history sequence for each power state and a predicted next power state; and
    based upon detected utilization of the processor during a time interval, determining, by a power manager module, a next power state for the processor for a next time interval, the next power state selected dependent on the stored phase transition history sequence for a current power state and on a run length encoding for a phase identifier.

9. The method of claim 8, further comprising:
computing, by the power manager module, processor utilization during a current time interval for a current power state.

10. The method of claim 9, wherein processor utilization is computed based on a number of executed micro-operations, a number of clock cycles and a number of stall cycles for the current time interval stored in performance-monitoring counters.

11. The method of claim 10, wherein the performance-monitoring counters are managed by an operating system.

12. The method of claim 8, wherein the processor has a plurality of cores.

13. The method of claim 8, wherein each power state is associated with a number of consecutive time intervals that the processor is in the current power phase.

14. The method of claim 8, wherein the next power state is the current power state.

15. A non-transitory computer usable medium including a computer readable code stored thereon having associated information, wherein the information, when accessed, results in a machine performing:

based on predicted utilization of a processor by a multi-threaded application executing in a dynamic run-time environment, storing, in a run length encoding Markhov model, a phase transition history sequence for each power state and a predicted next power state; and based upon detected utilization of the processor during a time interval, determining, by a power management module, a next power state for the processor for a next time interval, the next power state selected dependent on the stored phase transition history sequence for a current power state and on a run length encoding for a phase identifier.

16. The non-transitory computer usable medium of claim 15, further comprising:
computing processor utilization during a current time interval for a current power state.

17. The non-transitory computer usable medium of claim 16, wherein processor utilization is computed based on a number of executed micro-operations, a number of clock cycles and a number of stall cycles for the current time interval stored in performance-monitoring counters.

18. The non-transitory computer usable medium of claim 17, wherein the performance-monitoring counters are managed by an operating system.

* * * * *